United States Patent [19]

Ohkubo

[11] Patent Number: 4,946,279
[45] Date of Patent: Aug. 7, 1990

[54] FLOURESCENCE SPECTROPHOTOMETER FOR MEASURING FLUORESCENT LIGHT OF A PLURALITY OF WAVELENGTH CONDITIONS

[75] Inventor: Kunihiko Ohkubo, Moriyama, Japan
[73] Assignee: Shimadzu Corporation, Japan
[21] Appl. No.: 298,969
[22] Filed: Jan. 19, 1989
[30] Foreign Application Priority Data
  Feb. 16, 1988 [JP] Japan .................................. 63-34735
[51] Int. Cl.$^5$ ............................................ G01N 21/64
[52] U.S. Cl. ................................. 356/318; 250/458.1; 250/459.1
[58] Field of Search .............................. 356/317, 318; 250/458.1, 459.1, 461.1, 461.2

[56] References Cited

U.S. PATENT DOCUMENTS 4,299,486 11/1981 Nogami et al. ..................... 356/318
4,795,256 1/1989 Krause et al. ................... 356/318 X Primary Examiner—Vincent P. McGraw
Attorney, Agent, or Firm—Fidelman & Wolffe

[57] ABSTRACT

In a fluorescence spectrophotometer comprising a light source, an excitation monochromator, a sample cell, an emission monochromator, a photodetector and a signal processing device, an excitation light polarizer and an emission light polarizer are disposed in the excitation light path and the emission light path, respectively, and the excitation and emission light wavelengths of the two monochromators are changed simultaneously in accordance with each of a plurality of wavelength conditions, and in each of the wavelength conditions, the direction of polarization of the emission light polarizer is changed between two orthogonal directions, in each of which the output of the detector is sampled by the signal processor, and the processed data is stored so as to be used for calculation of the degree of polarization of the polarized fluorescent light from the sample.

12 Claims, 4 Drawing Sheets

FLOURESCENCE SPECTROPHOTOMETER FOR MEASURING FLUORESCENT LIGHT OF A PLURALITY OF WAVELENGTH CONDITIONS

BACKGROUND OF THE INVENTION

This invention relates generally to fluorescence spectroscopy and, more particularly, to a fluorescene spectrophotometer designed to measure polarized fluorescent light.

A fluorescene spectrophotometer generally comprises a light source, a primary or excitation monochromator, a sample cell containing a sample to be analyzed, a secondary or emission monochromator, a photodetector, and a signal processing device. The excitation monochromator selects a specific wavelength of the light from the light source and projects it onto the sample in the cell. The resultant fluorescene is introduced into the emission monochromator and a fluorescent light of a selected wavelength is directed onto the photodetector, which produces an electrical signal corresponding to the intensity of the fluorescent light.

To measure the degree of polarization of fluorescent light by a fluorescence spectrophotometer it has been customary to place a polarizer in the path of excitation light from the excitation monochromator to the sample and another polarizer in the path of fluorescence from the sample to the emission monochromator. In the prior art method of measuring the degree of polarization of fluorescent light, a sample is stained with a single kind of fluorescent dye to measure the degree of polarization of fluorescent light of a single wavelength. For example, in biotechnology by measuring the degree of polarization of a fluorescent light emitted by a cell stained with a fluorescent dye it is possible to know the fluidity of the membrane of the cell.

With recent advancement of biotechnology it has become necessary to measure the degree of polarization of the polarized fluorescent light from different parts of a single cell, such as the surface of the membrane of a cell or the interior thereof.

It is possible to stain different parts of a cell with different dyes. However, there are no fluorescene spectrophotometers available which can measure the time course of polarization of fluorescent light as well as the degree of polarization of the fluorescene of different wavelengths emitted by the same sample.

Accordingly, the primary object of the invention is to provide a fluorescene spectrophotometer which can measure the time course of polarized fluorescent light of more that two wavelengths emitted by a sample stained with more than two kinds of fluorescent dyes.

SUMMARY OF THE INVENTION

Figure 1:
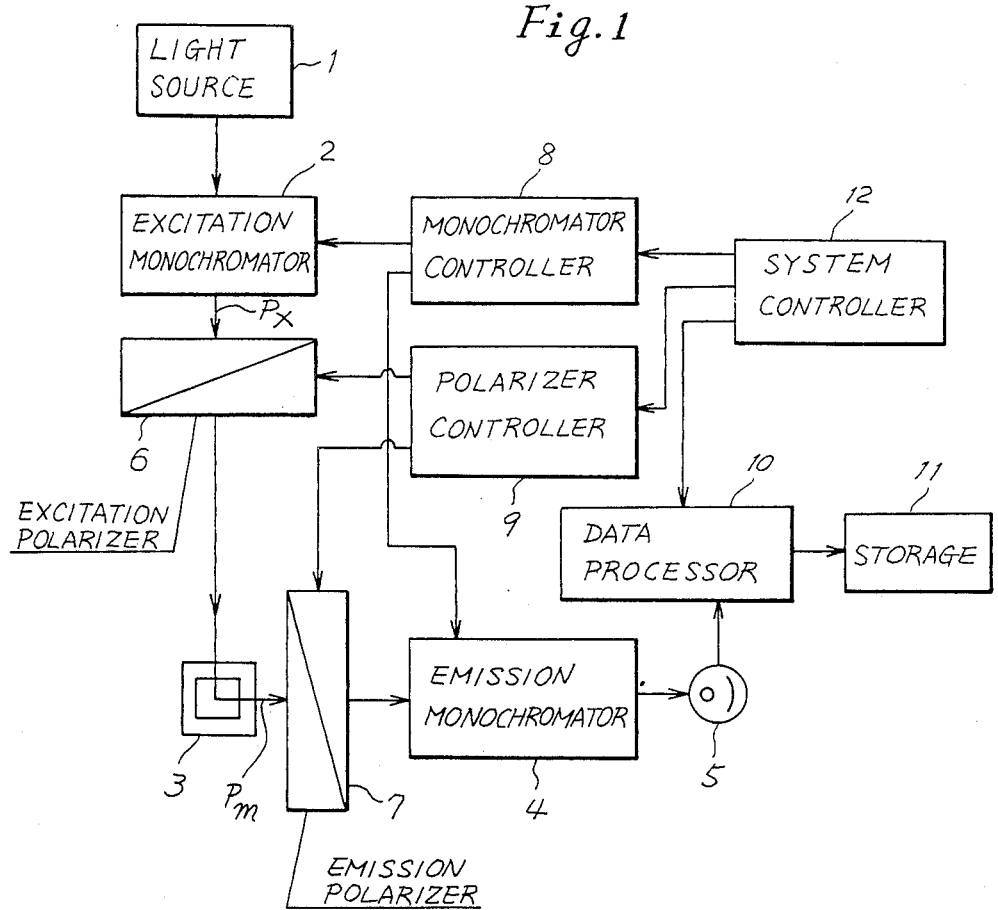
FIG. 1 is a schematic layout of the apparatus of the invention.

There is schematically shown in FIG. 1 a fluorescene spectrophotometer constructed in accordance with the invention, which comprises a light source 1, a first or excitation monochromator 2 which disperses the light from the source 1 into a series of wavelengths, one of which is selected so as to be projected onto a sample cell 3 containing a sample to be analyzed, which produces fluorescent light. A second or emission monochromator 4 disperses the fluorescent light into different wavelengths, which are selectively applied to a detector 5.

A first or excitation light polarizer (to be referred to as the excitation polarizer) 6 is placed in the optical path (to be referred to as the excitation light path) Px between the excitation monochromator 2 and the sample cell 3, and a second or emission light polarizer (to be referred to as the emission polarizer) 7 is placed in the optical path (to be referred to as the emission or fluorescent light path) Pm between the sample cell 3 and the emission monochromator 4.

A monochromator controller 8 controls the excitation monochromator 2 and the emission monochromator 4 synchronously so that the exciting light wavelength of the excitation monochromator 2 and the emission light wavelength of the emission monochromator 4 are changed in a pair in a manner to be described later in detail. A polarizer controller 9 controls the excitation polarizer 6 and the emission polarizer 7 individually so as to change the direction of polarization of each of the polarizers between two orthogonal directions. The direction of polarization means the direction of the electric vector of a light passing through the polarizer.

A data processor 10, which includes a preamplifier of the detector and a sampling A/D converter and a microprocessor, receives the detection signals from the detector 5 when the emission polarizer 7 is set to each of the two orthogonal directions of polarization, and a storage 11 stores the data from the processor 10. A system controller 12 controls the operations of the monochromator controller 8, the polarizer controller 9 and the signal processor 10.

For measurement of the degree of polarization of the polarized fluorescent light from a sample, the excitation polarizer 6 is set so that its direction of polarization is perpendicular to a plane including both the excitation light path Px and the emission light path Pm, and the position of the emission polarizer 7 is alternately changed between two orthogonal positions, that is, a first position where the direction of polarization of the emission polarizer 7 is parallel with the direction of polarization of the excitation polarizer 6, and a second position where the direction of polarization of the emission polarizer 7 is perpendicular to the direction of polarization of the excitation polarizer 6. In the first position as the directions of polarization of the excitation polarizer 6 and the emission polarizer 7 are parallel with each other, the polarizers may be said to be in the "parallel" state. In the second position as the directions of polarization of the two polarizers are perpendicular to each other, they may be said to be in the "perpendicular" state. Let "Ipar" be the intensity of the fluorescence from the sample in the parallel state of the polarizers and "Iper" be the fluorescene intensity in the perpendicular state of the polarizers, and the degree of polarization P will be given as:

$$P = (I_{par} - I_{per})/(I_{par} + I_{per}) \tag{1}$$

For simultaneous measurement of the degree of polarization of the fluorescence from a sample stained with two kinds of fluorescent dyes, the excitation light wavelength and the emission light (fluorescene) wavelength are simultaneously changed alternately between two wavelength conditions corresponding to the two fluorescent dyes, and under each of the wavelength conditions as the position of the emission polarizer is changed between the previously mentioned two orthogonal positions, measurement of the polarized fluorescent light from the sample is conducted at each of the polarizer positions so as to calculate the degree of polarization.

Figure 2:
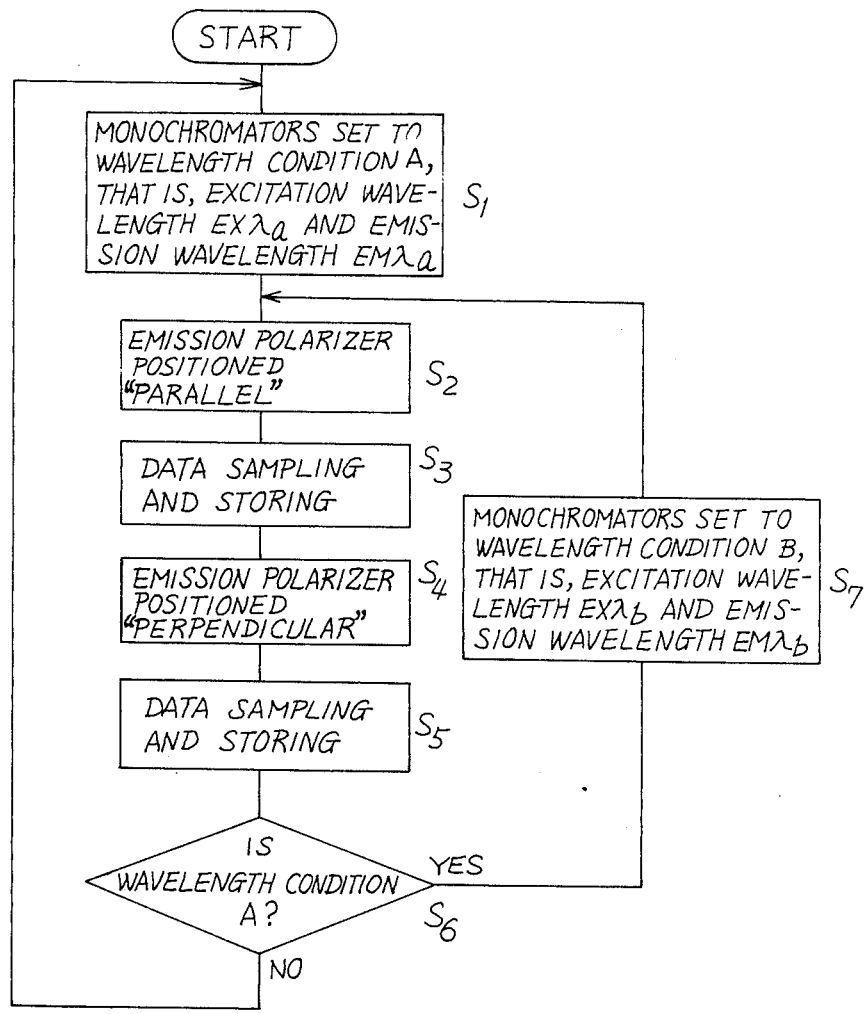
FIG. 2 is a flow chart showing an example of the operation of the apparatus.
Figure 3:
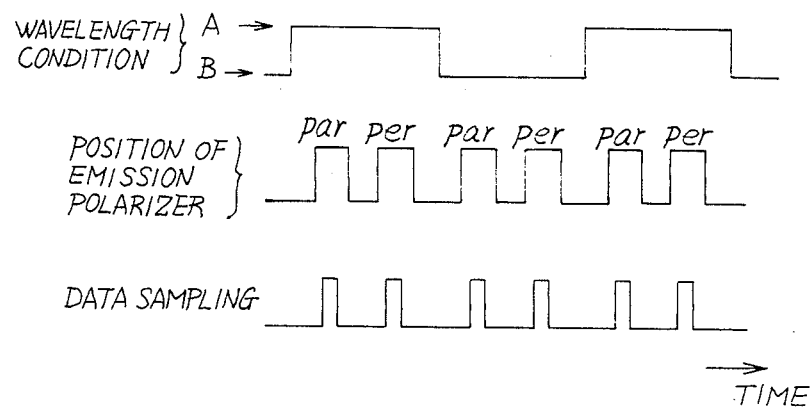
FIG. 3 is a timing chart showing the operation.

The operation will be described in further detail with reference to FIGS. 2 and 3 in an example wherein two wavelength conditions A and B each providing an excitation and an emission wavelength are alternated.

At step S1, the excitation wavelength of the excitation monochromator 2 is set to a wavelength Ex λ a of the wavelength condition A and the emission wavelength of the emission monochromator 4 is set to a wavelength Em λ a of the same wavelength condition A. The monochromator controller 8 controls the setting and changing of the excitation and emission wavelengths.

At step S2, with the excitation polarizer 6 being fixed at the previously mentioned position perpendicular to the plane including the excitation and emission light paths Px and Pm, the emission polarizer 7 is set by the polarizer controller 9 to the previously mentioned first position in which the direction of polarization of the emission polarizer 7 is "parallel" with the direction of polarization of the excitation polarizer 6. Then, at step S3 the data processor 10 samples the signals from the photodetector 5 and applies the processed data to the storage 11.

Then, at step S4 the position of the emission polarizer 7 is changed by the polarizer controller 9 to the previously mentioned second position in which the direction of polarization of the emission polarizer 7 is "perpendicular" to the direction of polarization of the excitation polarizer 6, whereupon at step S5 the data processor 10 samples the signals from the photodetector 5 and applies the processed data to the storage 11.

Then at step S6, whether the wavelength condition is A or not is checked, and if the condition is A, step 7 is taken. Otherwise, the step returns to S1.

At step S7, the monochromator controller 8 changes the wavelength of the excitation monochromator 2 and that of the emission monochromator 4 to the excitation wavelength ExλB and the emission wavelength EmλB of the other wavelength condition B, respectively. Thus, the wavelength condition changes alternately.

Under the wavelength condition B, as the position of the emission polarizer 7 is changed between the previously mentioned two orthogonal positions, that is, the positions in which the direction of polarization of the emission polarizer 7 is "parallel" and "perpendicular" to the direction of polarization of the excitation polarizer 6, respectively, the data processor 10 samples the signals from the detector 5 and the storage 11 stores the processed data (at steps S2 through S5).

The changing of the wavelength conditions, changing of the position of the emission polarizer 7, sampling of data from the detector and storing of the data in the storage 11 —all these operations are repeated under the control of the system controller 12.

Figure 4:
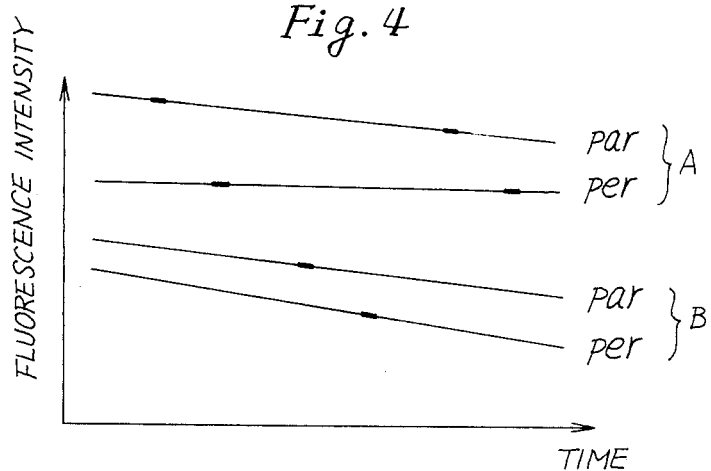
FIG. 4 is a graph showing the data obtained by the operation shown in FIG. 3.

In the above-mentioned manner, under the wavelength condition A the position of the emission polarizer 7 is changed between the two orthogonal positions so that one set of data is obtained as shown at A in the graph of FIG. 4, and also under the wavelength condition B the position of the emission polarizer 7 is changed between the two orthogonal positions so that another set of data is obtained as shown at B in the graph of FIG. 4. These data are stored at time-course data in the storage 11, and the degree of polarization P is calculated by arithmetic operation from the stored data. If the arithmetic operation is fast enough, real time calculation of the degree of polarization is possible.

PREFERRED EMBODIMENT OF THE INVENTION

Figure 5:
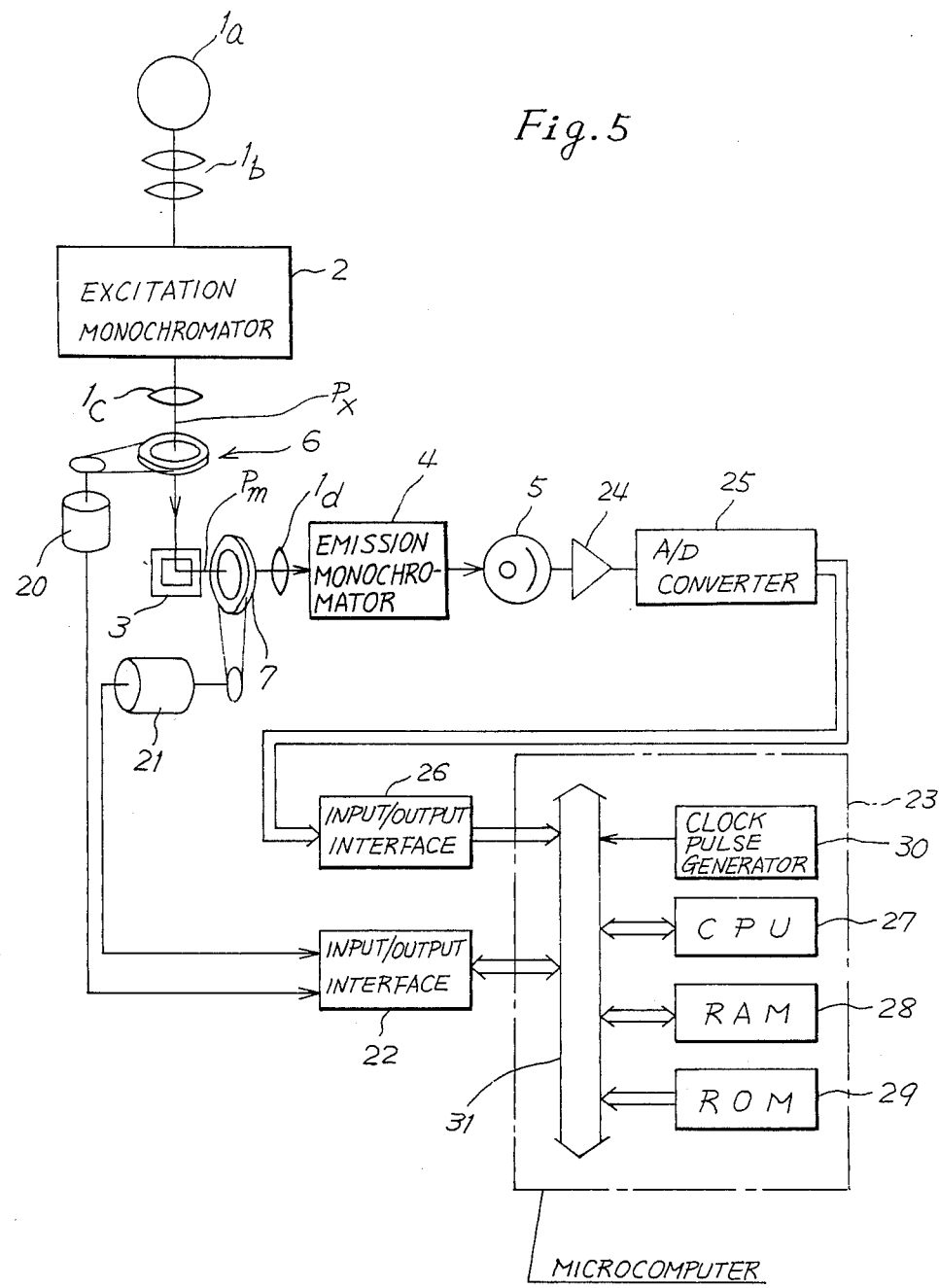
FIG. 5 is a block diagram of one embodiment of the invention.

Referring to FIG. 5, one embodiment of the invention will now be described. A xenon lamp 1a is used as a light source. The light from the lamp is focused by lens means 1b into a first or excitation monochromator 2. In the excitation light path Px of the monochromatic light from the excitation monochromatic 2, there is provided a first or excitation polarizer 6 which is rotatable by means of a first pulse motor 20 about an axis parallel with the optical axis of the excitation light path Px so that the direction of polarization of the excitation light that has passed through the polarizer 6 can be selectively set to two orthogonal directions. The polarized light frm the polarizer 6 is projected into a cell 3 containing a sample to be analyzed, whereupon the sample emits fluorescent ligh in every direction, of which the light directed to a lens 1d passes through the second or emission monochromator 4 along an emission light path Pm perpendicular to the excitation light path Px. In the emission light path Pm there is disposed a second or emission polarizer 7 which is rotatable by means of a second pulse motor 21 so that light having a parallel or a perpendicular direction of polarization may pass through the emission polarizer 7 in accordance with the direction of polarization of the polarizer. The pulse motors 20 and 21 are controlled through an input-output interface 22 by a microcomputer 23.

The emission monochromator 4 disperses the polarized fluorescent light that has passed through the polarizer 7 into different wavelengths, a selected one of which is received by a detector 5 which can be a photomultiplier tube. The detector 5 produces an electrical output signal corresponding to the intensity of the light received and applies the output signal to an amplifier 24. The amplified signal is converted by an A/D converter 25 to a digital signal, which applied to the microcomputer 23 through an input-output interface 26.

The microcomputer 23 comprises a central processing unit (CPU) 27, a random access memory (RAM) 28, a read-only memory (ROM) 29 and a clock pulse generator 30, all of which are connected through a bus line 31. The ROM 29 stores various programs necessary for the operation of the system, such as a program for changing the wavelengths of the monochromators 2 and 4, a program for changing the positions of the polarizers 6 and 7, and a program for sampling the measured data. The CPU 27 and ROM 29 correspond to the monochromator controller 8, the polarizer controller 9, the data processor 10 and the system controller 12 in the arrangement of FIG. 1 and the RAM 28 corresponds to the storage 11 in FIG. 1.

As described above, for measurement of the degree of polarization the position of the excitation polarizer 6 is fixed so that the direction of polarization of the polarizer 6 is perpendicular to the plane including the excitation and emission light paths Px and Pm.

For measurement of the polarization characteristic of the fluorescence spectrophotometer itself, the direction of polarization of the excitation ploarizer 6 should be changed. In particular, the direction of polarization of the excitation polarizer 6 is changed from the position perpendicular to the plane including the excitation and emission light paths Px and Pm to a position parallel with the plane, and with the excitation polarizer 6 held at the parallel position, the direction of polarization of the emission polarizer 7 is changed between the previously described two orthogonal directions "parallel" and "perpendicular" to the direction perpendicular to the plane including the light paths Px and Pm for measurement of the intensities of the components I'par and I'per of the polarized fluorescent light. The polarization characteristic G of the fluorescence spectrophotometer is given as the following expression:

$$G = I'\text{par}/I'\text{per} \qquad (2)$$

If $G=1$, the fluorescence spectrophotometer has no polarization characteristic.

If the polarization characteristic G is taken into consideration, the degree of polarization is given as:

$$P = (I\text{par} - G \cdot I\text{per})/(I\text{par} + G \cdot I\text{per}).$$

In the above embodiment, the sample is stained with two different kinds of fluorescent dyes. In case three or more kinds of fluorescent dyes are used, it is also possible to measure the polarized fluorescent light from a sample by providing three or more corresponding wavelength conditions, in each of which the direction of polarization of the emission polarizer is changed between two orthogonal directions.

What I claim is:

1. A fluorescence spectrophotometer comprising:
   a. a light source;
   b. an excitation monochromator for receiving the light from said light source to provide an excitation light of a selected wavelength;
   c. a sample cell containing a sample to be analyzed, to which said excitation light is projected to cause said sample to emit fluorescent light;
   d. an emission monochromator for receiving said fluorescent light to provide an emission light of a selected wavelength;
   e. a photodetector for converting said emission light to an electrical signal corresponding to the intensity of said emission light;
   f. means for controlling said excitation and emission monochromators to simultaneously change the wavelengths of said excitation and emission lights in accordance with each of a plurality of wavelength conditions;
   g. an excitation light polarizer disposed in the path of said excitation light;
   h. an emission light polarizer disposed in the path of said emission light;
   i. means for controlling the position of said emission light polarizer, in each of said wavelength conditions, so that the direction of polarization of said emission light polarizer may coincide selectively with each of the directions parallel and perpendicular to a plane including the light paths of said excitation and emission lights;
   j. signal processing means for sampling said output signal from said photodetector, in each of said wavelength conditions, when the direction of polarization of said emission light polarizer coincides with each of said parallel and perpendicular directions, and processing said sampled signal; and
   k. means for storing said processed signal.

2. The fluorescene spectrophotometer of claim 1, wherein said excitation light polarizer is fixed so that the direction of polarization thereof lies perpendicular to said plane including said excitation and emission light paths.

3. The fluorescence spectrophotometer of claim 1, further including means for controlling the position of said excitation light polarizer so that the direction of polarization of said excitation light polarizer may coincide selectively with each of two orthogonal directions.

4. The fluorescence spectrophotometer of claim 3, wherein one of said two orthogonal directions is parallel to said plane including said excitation light path and said emission light path while the other is perpendicular to said plane.

5. The fluorescence spectrophotometer of claim 1, wherein said sample to be analyzed is stained with at least two different kinds of fluorescent dyes.

6. A method of mearsuring polarized fluorescent light in a fluoresccent spectrophotometer which comprises: a light source; an excitation monochromator for receiving the light from said light source to provide an excitation light of a selected wavelength; a sample cell containing a sample to be analyzed, to which said excitation light is projected to cause said sample to emit fluorescent light; an emission monochromator for receiving said fluorescent light to provide an emission light of a selected wavelength; a photodetector for converting said emission light to an electrical signal corresponding to the intensity of said emission light; means for controlling said excitation and emission monochromators; an excitation light polarizer disposed in the path of said excitation light; an emission light polarizer disposed in the path of said emission light; means for controlling the position of said emission light polarizer; signal processing means for sampling said output signal from said photodetector and processing said sampled signal; and means for storing said processed signal;

said method comprising:

controlling said excitation and emission monochromators to simultaneously change the wavelengths of said excitation and emission lights in accordance with each of a plurality of wavelength conditions;

controlling the position of said emission light polarizer, in each of said wavelength conditions, so that the direction of polarization of said emission light polarizer coincides selectively with each of the directions parallel and perpendicular to a plane including the light paths of said excitation and emission lights; and sampling said output signal from said photodetector, in each of said wavelength conditions, when the direction of polarization of said emission light polarizer coincides with each of said parallel and perpendicular directions.

7. The method of claim 6, wherein said excitation light polarizer is fixed so that the direction of polarization thereof lies perpendicular to said plane including said excitation and emission light paths.

8. The method of claim 6, further comprising controlling the position of said excitation light polarizer so that the direction of polarization of said excitation light polarizer coincides selectively with each of two orthogonal directions.

9. The method of claim 8, wherein one of said two orthogonal directions is parallel to said plane including said excitation light path and said emission light path while the other is perpendicular to said plane.

10. The method of claim 6, wherein said sample to be analyzed is stained with at least two different kinds of fluorescent dyes.

11. The method of claim 6, wherein the method comprises the following steps:
  controlling said excitation and emission monochromators according to a first wavelength conditions;
  controlling the position of said emission light polarizer so that the direction of polarization of said emission light polarizer coincides selectively with each of the directions parallel and perpendicular to a plane including the light paths of said excitation and emision lights;
  sampling said output signal from said photodetector when the direction of polarization of said emission light polarizer coincides with each of said parallel and perpendicular directions;
  controlling said excitation and emission monochromators according to a second wavelength condition;
  controlling the position of said emission light polarizer so that the direction of polarization of said emission light polarizer coincides selectively with each of the directions parallel and perpendicular to a plane including the light paths of said excitation and emission lights; and
  sampling said output signal from said photodetector when the direction of polarization of said emission light polarizer coincides with each of said parallel and perpendicular directions.

12. The method of claim 11, wherein said sample to be analyzed is stained with at least two different kinds of fluorescent dyes.

* * * * *